United States Patent
Yu

(10) Patent No.: US 12,481,677 B1
(45) Date of Patent: Nov. 25, 2025

(54) LOW RANK ADAPTATION IN MULTICLASS DEEP LEARNING CLASSIFIERS

(71) Applicant: Coupa Software Incorporated, San Mateo, CA (US)

(72) Inventor: Hongyang Yu, Sydney (AU)

(73) Assignee: Coupa Software Incorporated, Foster City, CA (US)

(*) Notice: Subject to any disclaimer, the term of this patent is extended or adjusted under 35 U.S.C. 154(b) by 0 days.

(21) Appl. No.: 18/397,313

(22) Filed: Dec. 27, 2023

(51) Int. Cl.
*G06F 7/00* (2006.01)
*G06F 16/28* (2019.01)

(52) U.S. Cl.
CPC ............................... *G06F 16/285* (2019.01)

(58) Field of Classification Search
CPC .......................................... G06F 16/285
See application file for complete search history.

(56) References Cited

U.S. PATENT DOCUMENTS

| | | | | |
|---|---|---|---|---|
| 2011/0029250 A1* | 2/2011 | Mott | ................. | G16Z 99/00 702/19 |
| 2011/0119212 A1* | 5/2011 | De Bruin | ................. | A61B 5/369 706/12 |
| 2016/0012333 A1* | 1/2016 | Takahashi | ................. | G06N 5/02 706/12 |
| 2018/0197105 A1* | 7/2018 | Luo | ................. | G06F 16/355 |
| 2019/0156247 A1* | 5/2019 | Faulhaber, Jr. | ........ | G06N 3/045 |
| 2019/0294999 A1* | 9/2019 | Guttmann | ............. | G06F 18/217 |
| 2020/0034665 A1* | 1/2020 | Ghanta | ................. | G06N 5/04 |
| 2020/0161005 A1* | 5/2020 | Lyman | ................. | G06N 5/04 |
| 2020/0357117 A1* | 11/2020 | Lyman | ................. | G06T 7/0012 |
| 2021/0027193 A1* | 1/2021 | Monaghan | ............. | G06N 20/00 |
| 2021/0034985 A1* | 2/2021 | Vongkulbhisal | ... | G06V 10/7753 |
| 2021/0192362 A1* | 6/2021 | Oki | ................. | G06N 5/01 |
| 2021/0319098 A1* | 10/2021 | Pogorelik | ............. | G06N 3/094 |
| 2022/0036194 A1 | 2/2022 | Sundaresan et al. | | |
| 2022/0269346 A1* | 8/2022 | Hussami | ................. | G06F 3/012 |

(Continued)

OTHER PUBLICATIONS

Edward Hu et al, "LORA: Low-Rank Adaptation of Large Lan-Guage Models," arXiv:2106.09685v2, web retrieval Nov. 1, 2024, https://doi.org/10.48550/arXiv.2106.09685, Oct. 16, 2021, 26 pages.

(Continued)

*Primary Examiner* — Mohammed R Uddin
(74) *Attorney, Agent, or Firm* — Baker Botts L.L.P.

(57) ABSTRACT

The computer-implemented method utilizes machine learning models to classify input data records. The method includes selecting machine learning models from a plurality of machine learning models using a router model and generating classification inferences for each selected model. The classification inferences include factors indicating the probability of the input data record belonging to various candidate classes. Any one of the plurality of machine learning models is configured to use a weight matrix calculated as the sum of a base weight matrix and a model-associated difference matrix obtained as a product of two low-rank matrices. The classification inferences from selected models are then combined to create an overall classification inference, providing factors related to the probability of the input data belonging to each candidate class. This method enables effective classification by leveraging multiple machine learning models.

18 Claims, 6 Drawing Sheets

(56) References Cited

U.S. PATENT DOCUMENTS

| | | | |
|---|---|---|---|
| 2022/0269980 A1* | 8/2022 | Keren | G06V 10/82 |
| 2022/0358749 A1* | 11/2022 | Yonetani | G06N 3/08 |
| 2022/0383126 A1* | 12/2022 | Chen | G06N 3/04 |
| 2022/0415022 A1* | 12/2022 | Brumby | G06V 20/188 |
| 2023/0019779 A1* | 1/2023 | Santana De Oliveira | G06F 21/6245 |
| 2023/0044078 A1 | 2/2023 | Kumar et al. | |
| 2023/0074474 A1* | 3/2023 | Imai | G06N 3/09 |
| 2023/0106213 A1* | 4/2023 | Hsu | G06N 3/096 706/12 |
| 2023/0124380 A1* | 4/2023 | Goldszmidt | G06N 20/20 706/12 |
| 2023/0153421 A1* | 5/2023 | Givental | G06N 5/01 726/23 |
| 2023/0162049 A1* | 5/2023 | Hall | G16H 40/67 706/45 |
| 2023/0162088 A1* | 5/2023 | Woodward | G06F 18/217 706/12 |
| 2023/0281510 A1* | 9/2023 | Royer | G06N 3/084 706/12 |
| 2023/0376858 A1 | 11/2023 | Tai et al. | |
| 2024/0071048 A1* | 2/2024 | Kandemir | G06N 20/00 |
| 2024/0095583 A1* | 3/2024 | Austin | G06N 3/088 |
| 2024/0143976 A1* | 5/2024 | Lee | G06N 20/20 |
| 2024/0144050 A1* | 5/2024 | Wang | G06N 3/08 |
| 2024/0177244 A1* | 5/2024 | Yu | G06Q 40/12 |
| 2024/0282449 A1* | 8/2024 | Martinez | G16H 50/70 |
| 2024/0372815 A1* | 11/2024 | Sirov | H04L 43/55 |

OTHER PUBLICATIONS

Armen Aghajanyan, "Intrinsic Dimensionality Explains the Effectiveness of Language Model Fine-Tuning," arXiv:2012.13255v1, web retrieval Nov. 1, 2024, https://doi.org/10.48550/arXiv.2012.13255, Dec. 22, 2020, 11 pages.

Zeyuan Allen-Zhu, "A Convergence Theory for Deep Learning via Over-Parameterization," arXiv:1811.03962v5, web retrieval Nov. 1, 2024, https://doi.org/10.48550/arXiv.1811.03962, Jun. 17, 2019, 53 pages.

* cited by examiner

LOW RANK ADAPTATION IN MULTICLASS DEEP LEARNING CLASSIFIERS

TECHNICAL FIELD

This disclosure relates to the application of machine learning models to classification tasks, particularly the disclosure relates to fine-tuning of several machine learning models to perform classification tasks through a low rank adaptation approach.

BACKGROUND

Mixture of experts (MoE) approaches for machine learning systems have demonstrated effectiveness in classification tasks, owing to their ability to handle complex and diverse datasets with enhanced accuracy. Unlike traditional single-model approaches, MoE models employ multiple specialized sub-models, each trained to excel in specific aspects of input data. This diversity empowers the machine learning systems to adapt to the varied patterns and nuances within the dataset, effectively capturing intricate relationships and dependencies that may not be captured by a single model. The adaptability of MoE models is further enhanced by the ability to seamlessly incorporate new sub-models into the MoE architecture as needed. For instance, when faced with a new classification task, it often proves beneficial to expand the MoE model by adding new sub-models. These new sub-models can be specifically tailored to address the unique characteristics and patterns of the new task, leveraging the strengths of MoE models in capturing relationships and dependencies within input data.

However, despite the effectiveness of MoE for classification tasks, training MoE sub-models poses significant challenges, particularly when dealing with large weight matrices. The sheer size of these matrices can lead to several computational and practical issues that hinder the overall effectiveness and efficiency of MoE models. For example, training sub-models with large weight matrices in an MoE model can be computationally expensive, requiring substantial computing resources and training time. This can be particularly problematic when dealing with large datasets or when training multiple sub-models concurrently. Additionally, the storage requirements for large weight matrices can be substantial, often exceeding the available memory resources on standard computing systems. This can lead to memory overflows and out-of-memory errors, hindering the training process and limiting the scalability of MoE models. Furthermore, large weight matrices can increase the risk of overfitting, where the model memorizes the training data instead of generalizing it to unseen data. This can lead to poor performance on test data and limit the practical applicability of the MoE model. This can be detrimental to real-time applications that require rapid and efficient predictions.

Consequently, there is a need for an improved approach for adapting multiple machine learning models for various classification tasks while minimizing the computational costs associated with training machine learning models with large weight matrices. The present disclosure addresses these issues by providing a computationally efficient approach.

SUMMARY

Embodiments described herein relate to a method and a system to classify input data records using machine learning models.

In some embodiments, the method is provided. The method includes selecting one or more machine learning models from a plurality of machine learning models to perform a classification task using a router model based on an input data record. The method further includes generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix. Additionally, the method includes combining the classification inferences from each one of the one or more machine learning models to produce an overall classification inference, wherein the overall classification inference comprises a set of factors related to the probability that the input data record belongs to each one of the plurality of candidate classes, the overall classification inference being based on the classification inferences from each one of the one or more selected machine learning models.

In some embodiments, the system is provided. The system is implemented by one or more computers for classifying input data records using machine learning models. The system includes one or more memories having computer readable computer instructions, and one or more processors for executing the computer readable computer instructions to perform a method. The method includes selecting one or more machine learning models from a plurality of machine learning models to perform a classification task using a router model based on an input data record. The method further includes generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix. Additionally, the method includes combining the classification inferences from each one of the one or more machine learning models to produce an overall classification inference, wherein the overall classification inference comprises a set of factors related to the probability that the input data record belongs to each one of the plurality of candidate classes, the overall classification inference being based on the classification inferences from each one of the one or more selected machine learning models.

In some embodiments, one or more computer-readable non-transitory storage media storing computer readable programming instructions is provided. The instructions are configured to be executed by one or more processors to perform a method. The method includes selecting one or more machine learning models from a plurality of machine learning models to perform a classification task using a router model based on an input data record. The method further includes generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix. Additionally, the method includes combining the classification inferences from each one of the one or more machine learning models to produce an overall classification inference, wherein the overall classification inference comprises a set of factors related to the probability that the input data record belongs to each one of the plurality of candidate classes, the overall classification inference being based on the classification inferences from each one of the one or more selected machine learning models.

In some embodiments, the plurality of machine learning models further comprises a third machine learning model, where a matrix component of the third machine learning model is the base weight matrix.

In some embodiments, the first difference matrix is calculated by multiplying a first low rank matrix by a second low rank matrix, wherein a rank of the first low rank matrix is equal to a rank of the second low rank matrix, and the rank of the first low rank matrix is less than a rank of the base matrix, and wherein the second difference matrix is calculated by multiplying a third low rank matrix by a fourth low rank matrix, wherein a rank of the third low rank matrix is equal to a rank of the fourth low rank matrix, and the rank of the third low rank matrix is less than a rank of the base matrix.

In some embodiments, the first machine learning model has been trained using a training method. The training method includes calculating a classification inference by the first machine learning model based on a training input data record, calculating a loss function related to the difference between the classification inference and an expected output of the machine learning model, and updating at least one of the first low rank matrix or second low rank matrix to reduce an error between the classification inference and the expected output of the machine learning model.

In some embodiments, the generating the classification inference from each one of the one or more selected machine learning models further includes storing, in a memory, the base weight matrix, and storing, in the memory, the first low rank matrix, the second low rank matrix, the third low rank matrix, and the fourth low rank matrix. The generating the classification inference further includes calculating the matrix component of the first machine learning model by multiplying the first low rank matrix by the second low rank matrix, and adding the base weight matrix, and calculating the matrix component of the second machine learning model by multiplying the third low rank matrix by the fourth low rank matrix and adding the base weight matrix.

In some embodiments, the set of factors are probability values that input data record belongs to each one of the plurality of candidate classes.

In some embodiments, the set of factors related to a probability is generated using a softmax function.

In some embodiments, the selecting of one or more machine learning models using the router model includes determining a plurality of probability scores, each one corresponding to one of the plurality of machine learning models, and wherein each one of the plurality of probability scores representing a likelihood that the corresponding one of plurality of machine learning models produces the classification inference closely matching an expected output.

In some embodiments, the selecting of one or more machine learning models using the router model includes selecting the one or more machine learning models from the plurality of machine learning models with corresponding probability scores above a predetermined threshold.

In some embodiments, the selecting of one or more machine learning models using the router model includes selecting a predetermined number of the one or more machine learning models from the plurality of machine learning models, the predetermined number of the one or more machine learning models having highest corresponding probability scores.

In some embodiments, the predetermined number is one.

In some embodiments, the combining of the classification inferences comprises summation of the classification inferences generated from each one of the one or more selected machine learning models weighted by the probability scores corresponding to each one of the one or more selected machine learning models.

In some embodiments, the classification of the input data records includes classifying at least one of text or images within an input document into data fields.

In some embodiments, the candidate classes include a first set of classification labels, and the method further includes appending the candidate classes by at least one new classification label and adding at least one new machine learning model to the plurality of machine learning models.

In some embodiments, the router model has been trained using a router training method, the router training method including calculating an overall loss function related to a difference between the overall classification inference and an expected overall classification inference, and adjusting the plurality of probability scores via a backpropagation to reduce the overall loss function.

The embodiments disclosed herein are only examples, and the scope of this disclosure is not limited to them. Some embodiments may include all, some, or none of the components, elements, features, functions, operations, or steps of the embodiments disclosed herein. Embodiments according to the invention are in particular disclosed in the attached claims directed to a method, a storage medium, and a system, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The disclosed system provides several practical applications and technical advantages. It features a prediction model capable of diverse classifications. This model uniquely integrates the capabilities of multiple models, achieving near parity in the performance of several models while maintaining aspects of the efficiency of a single one. This enhancement translates into a more streamlined and effective use of computing resources. The system's versatility allows application to a range of classification tasks, contributing significantly to improved computer performance. An important aspect is its use of multiple machine learning models, each with associated weight matrices. These matrices share a common base matrix and incorporate a difference matrix calculated through multiplication of low-rank matrices. This approach results in a prediction model that significantly advances data classification capabilities while reducing the computational burden on resources and devices. Leveraging this prediction model improves the efficiency of computing resources, including memory and processing power. This efficiency is particularly crucial for classification tasks, which traditionally have high resource demands.

DETAILED DESCRIPTION

Figure 1:
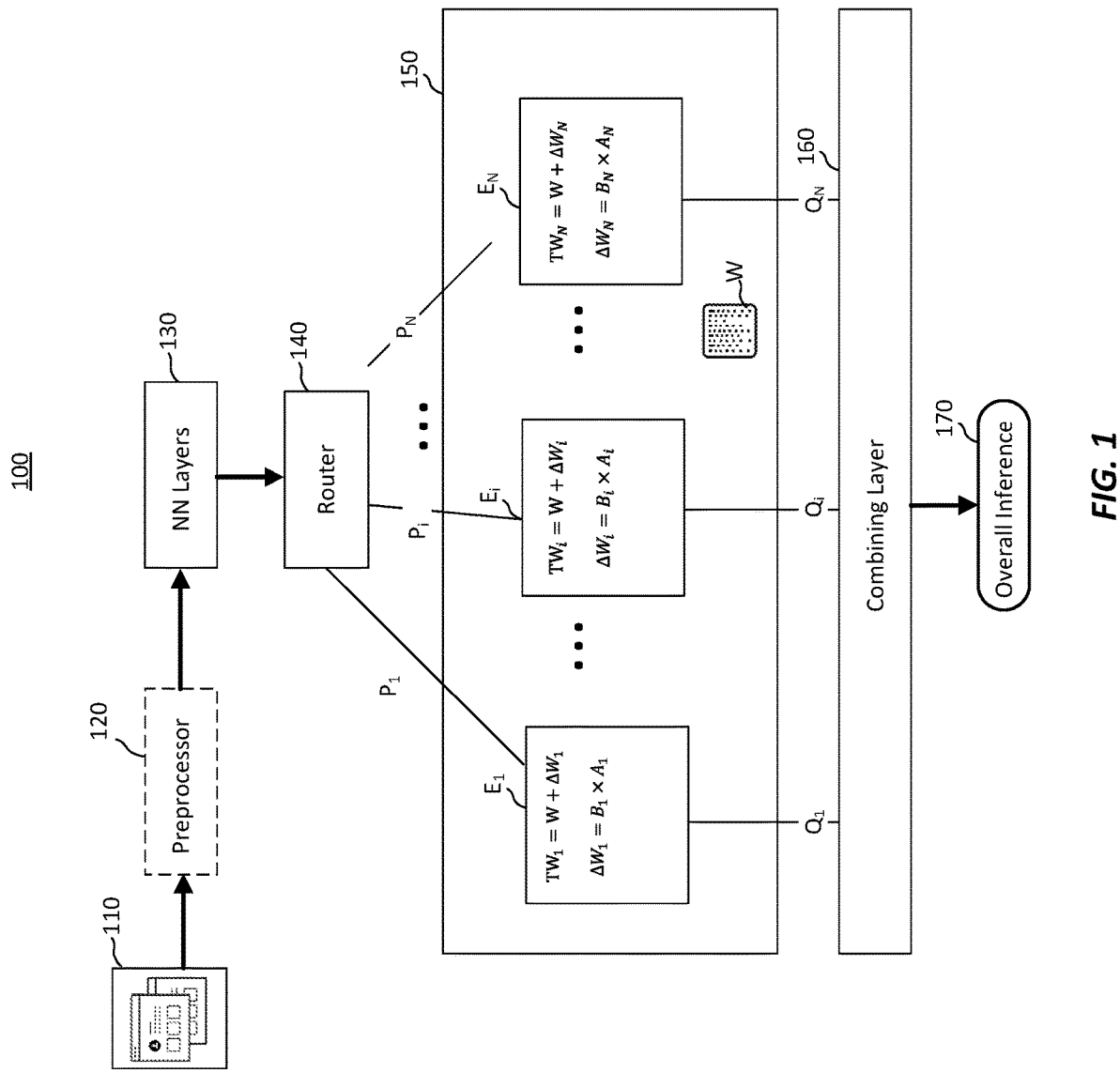
FIG. 1 is an example predictive model for classification tasks, in accordance with disclosed embodiments.

In the following description, for the purposes of explanation, numerous specific details are set forth to provide a thorough understanding of the present disclosure. It will be apparent, however, that embodiments of the present disclosure may be practiced without these specific details. In other instances, well-known structures and devices are shown in block diagram form to avoid unnecessarily obscuring the description of the present disclosure.

The text of this disclosure, in combination with the drawing figures, is intended to state in prose the algorithms that are necessary to program the computer to implement various embodiments, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement embodiments of the present disclosure.

Various embodiments may be described in this disclosure to illustrate various aspects. Other embodiments may be utilized and structural, logical, software, electrical, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the present disclosure more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary, and does not imply that the illustrated process is preferred. The steps may be described once per embodiment but need not occur only once. Some steps may be omitted in some embodiments or some occurrences, or some steps may be executed more than once in each embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present disclosure in which, for example, functions may be executed out of order from that shown or discussed, including substantially concurrently or in reverse order, depending on the functionality involved.

Model Description

This disclosure, in its various embodiments, describes a method and a system for the classification and extraction of data records from various data files containing text, images, video, or other multimedia. In some cases, the data files may include documents. The documents may include text/image data structured in columns, tables, and the like. As illustrative examples, such documents can include invoices, contracts, receipts, financial statements, letters, emails, purchase orders, employee handbooks, memos, slide presentations, and the like. In various cases, the documents may include one or more data fields (herein also referred to as data records), which can be classified as a header, billing information, customer information (e.g., a customer name, an address, an email, an occupation, and the like), a date, a due date, an itemized list of products or services, payment information, a section about terms and conditions, an invoice number, a note, and the like. In various scenarios, a significant number, ranging from several tens to hundreds or even several hundred of common fields may be utilized.

In many instances, a machine learning model may be used to process the documents and classify the common fields. In many cases, when using a machine learning model to classify the data fields, certain fields may be classified with high accuracy (e.g., with a high probability of being correct), while, some other critical fields, may only be classified with a significantly lower accuracy. Consequently, the overall machine learning classification accuracy may be constrained to data fields that cannot easily be classified, thereby necessitating human processing.

The observed suboptimal performance is attributable to two well-recognized uncertainty principles in the domain of deep learning, namely aleatoric uncertainty and epistemic uncertainty. Aleatoric uncertainty, stemming from external factors, particularly those associated with training data, can be manifested due to data contamination. For example, a fairly large (e.g., 5-20 percent) percentage of the training dataset is marred by inaccurate labels, stemming from errors during template stamping or human labeling. Despite continuous enhancements in the data collection process, complete eradication of this issue proves exceptionally challenging given the substantial training data volume, numbering in thousands, millions, or tens of millions of training data records.

In various embodiments, mitigation strategies can be employed to address the adverse effects of data contamination. Specifically, label smoothing has been introduced into the loss function to prevent the neural network from overly relying on labels, thereby enhancing the robustness.

Conversely, epistemic uncertainty is inherent to the learning capacity of a deep learning model and is contingent on factors such as the number of parameters and model architecture. For example, a deep learning model's learning capacity may be related to the number of its parameters and its model architecture. For example, a generative pre-trained transformer (GPT) generally performs better as its model size increases. However, increasing parameters does not always lead to capacity improvement. For instance, a recurrent neural network (RNN) cannot outperform some generative pre-trained transformers even with the same number of parameters, due to model architecture.

Achieving uniformly high performance across all classes with a finite model capacity seems implausible, particularly when employing stochastic gradient descent (SGD) for optimization. SGD's tendency to follow the steepest path during training allocates a majority of the model capacity to easily trainable classes, leaving limited capacity to address more challenging classes. As a result, performance disparities among classes emerge over the course of training.

An alternative solution to using a single machine learning model involves deploying multiple machine learning models. In some embodiments, the machine learning models may be identical in architecture and may have the same parameters before training. In an example implementation, a machine learning model may be used for the classification of a particular field within a document or a set of fields. While theoretically viable, this approach is frequently cost-prohibitive in practice. To address this problem, the present disclosure proposes a solution, that aims to reconcile the need to spread capacity across field classes with efficiency in training and deployment, providing a solution to the model capacity challenge.

Traditionally, classifier machine-learning models require predefining the number of field classes before training. This leads to inflexibility, as adding new classes necessitates complete retraining. This is particularly problematic for deep learning models when customers request the extraction of new fields, significantly prolonging delivery timeframes.

Complete retraining is also wasteful, especially when new field classes are related to existing ones. For instance, a new tax field on an invoice might be related to existing fields by both physical proximity and semantic similarity.

To address this inflexibility and inefficiency, we propose a novel predictive model that is configured to be able to incorporate one or more new classes without requiring a complete retraining of the entire predictive model, and at the same time capable of leveraging existing knowledge store in the trained weights for achieving a better prediction accuracy when making classification inferences for a new field class.

The architecture of this predictive model leverages a "divide and conquer" strategy, breaking down complex problems into smaller, more manageable sub-problems. The predictive model includes multiple machine learning models, each excelling in a particular one or several classification tasks. The machine learning models are configured to generate classification interferences which may then be combined using a specialized combining layer to produce the final output. In various cases, the predictive model can be configured to activate only a few relevant machine learning models based on the received input, thus, ensuring access to full model capacity while minimizing computational cost. This sparsity in selecting specific machine learning models for classification tasks can significantly improve inference efficiency and enable the incorporation of new classes without requiring complete retraining.

An illustrative embodiment of a predictive model 100 is shown in FIG. 1. The predictive model 100 includes one or more neural network layers 130 (NN layers 130), a router layer 140 (also referred to as a router model 140), and a prediction layer 150 containing a plurality of machine learning models $E_1$-$E_N$, as shown in FIG. 1. The predictive model 100 is configured to receive input data 110 and output overall inference 170.

Neural network layers 130 may be any suitable network layers, for example, such layers may be convolutional layers, feed-forward layers, or any other suitable layers for processing input data 110. In some cases, when the predictive model is a transformer model, the neural network layers may include self-attention layers, multi-head attention layers, embedding layers, normalization layers, and the like.

Input data 110 may be any suitable data such as text, image, video, audio data, or a combination thereof. In some cases, input data 110 includes data obtained from documents such as invoice documents, or any other documents that can contain text and image data.

During training and inference, router layer 140 is configured to select a limited number of models from $E_1$-$E_N$. Each selected model generates a classification inference. These inferences are then combined by a combining layer 160. In one embodiment, the combining layer 160 utilizes weighted averaging of the selected models' inferences to produce the overall classification inference.

In some cases, router layer 140 can be thought of as a gating mechanism configured to select one or more machine learning models $E_1$-$E_N$ for the required classification tasks. In one embodiment, router layer 140, analyzes input data and uses a suitable neural network to calculate factors related to the probability of each machine learning model $E_1$-$E_N$ being best suited to handle a particular field or input data record. Further, based on the calculated factors, router layer 140 may be configured to select a limited number of machine learning models from machine learning models $E_1$-$E_N$. For example, router layer 140 may be configured to select one, two, three, four, five, or any other number of suitable machine learning models from machine learning models $E_1$-$E_N$. For example, router layer 140 may be configured to select machine learning models $E_2$ and $E_7$.

In various embodiments, router layer 140 may determine which one or more machine learning methods to select for classification tasks based on the processing of input data 110. This determination relies on the information obtained from the input data 110. In various cases, input data 100 is processed such that it is transformed into a form that router layer 140 can use to compute weights for the machine learning models $E_1$-$E_N$. As described above, input data 110 can include a variety of formats, including text, images, videos, audio, or any combination thereof (e.g., multimedia data). When text is present within input data 110, it may undergo conversion into embedding vectors, effectively transforming it into a numerical representation. Similarly, any accompanying image, video, or audio data may also be converted into a suitable numerical representation for further processing by routing layer 140. In some cases, for image and video data, features may be extracted using a convolutional neural network (CNN).

In some embodiments, the input data may further be transformed using, for example, a linear transformation. For example, when input data is represented by a vector X, the transformed data may be represented by D·X+E, where D is a weight matrix and E is a bias vector. As a result, the linear transformation may then be passed through an activation function (e.g., rectified linear unit, sigmoid, or any other suitable activation function), which can introduce non-linearity to the model and allow to capture of complex patterns in input data 110. Subsequently, the resulting data may be normalized and used for calculating factors (e.g., probability scores $P_1$-$P_N$ as shown in FIG. 1) related to the probability of each machine learning model $E_1$-$E_N$ being best suited to handle that particular input data field. In other words, probability scores $P_1$-$P_N$ represent likelihoods that corresponding machine learning models $E_1$-$E_N$ produce the classification inference closely matching an expected output.

In some implementations, router layer 140 is configured to calculate probability scores for each expert based on the processed input data 110. Probability scores $P_1$-$P_N$ can determine the contribution of each machine learning model from $E_1$-$E_N$ to the final output. The probability scores are often computed using a softmax function to ensure they sum up to 1 and represent probabilities. For example, when the input data 110 is transformed into a vector having N components (N being the number of machine learning models), then the softmax function can be used for the transformed vector to determine the probabilities of each machine learning model $E_1$-$E_N$ being the best suited to handle that particular input data record.

An example approach of calculating probability scores may include calculating a vector y, having components $y_i$ such that $$y_i = \sum_{j=1}^{M} w_{ij} x_j + b_i, w_{ij}$$

are a weight associated with the $y_i$ component, $x_j$ is a j-th component of input data record represented by a vector x, and $b_i$ is a bias term for the i-th element $y_i$. The results of linear transformation then can be passed through an activation function such as, for example, rectified linear unit (ReLU), sigmoid, or hyperbolic tangent (tanh), resulting in vector z=activation(y). Subsequently, a softmax function given by $$p(z_i) = \exp(z_i) \Big/ \sum_{j=1}^{N} z_j,$$

is computed to obtain probability scores.

In some cases, all of the machine learning models $E_1$-$E_N$ may be selected for determining an inference with the overall inference determined based on a weighted inference output of the machine learning models $E_1$-$E_N$. Alternatively, machine learning models having associated probability scores higher than a predetermined threshold may be selected for the classification inference. For instance, only machine learning models with probability scores higher than the predetermined threshold of 0.1, 0.05, or 0.01 may be selected. In some cases, the predetermined threshold may be calculated as 1/N, 2/N, 3/N, and the like (here N is the number of machine learning modes). In some cases, a particular fraction of machine learning models may be selected with the highest probability scores. For instance, the top 1-50, percent of machine learning models may be selected including all the integer and real percent values in between. In some cases, only a particular number of machine learning models may be selected, such as top 1, top [N/10], top [N/5], top [N/2] machine learning models may be selected, and the like (herein, [ ] is an operator denoting the closest integer value of a fraction). In some cases, top [N/R] machine learning models may be selected with R ranging between 1-N including all the values in between. For example, in some cases, only one machine learning model can be selected for a classification inference.

As described above, prediction layer 150 includes a plurality of machine learning models $E_1$-$E_N$. In various embodiments, machine learning models $E_1$-$E_N$ may be used for one or more classification tasks and may have identical architecture. For example, models $E_1$-$E_N$ may be any suitable neural network models such as a multilayer perceptron (MLP), convolutional or recurrent neural networks. Any machine learning model that uses as a component a set of weights that can be represented as a matrix can be used in accordance with embodiments. In various cases, $E_1$-$E_N$ models may be based on a foundation model pre-trained to perform at least some classification tasks. For example, models $E_1$-$E_N$ may be fine-tuned to perform various classification tasks while maintaining the architecture of the foundation model. In various cases, the foundation model may include a base weight matrix W, as shown in FIG. 1. Base weight matrix W holds a collection of numerical values that determine the strength of the connections between neurons in different layers of the network. Each element in base weight matrix W represents the weight assigned to the connection between two specific neurons.

In various cases, when the foundation model is trained, base weight matrix W is determined through the training process. Models $E_1$-$E_N$ can then be formed by copying the foundation model and determining their respective weight matrices $TW_1$-$TW_N$. Each weight matrix $TW_1$-$TW_N$ may be determined as a sum of base weight matrix W and a difference matrix, which represents an update to the weight matrix. For example, $TW_1$ is given as a sum of base weight matrix W and a difference matrix $\Delta W_1$ represented by a product of two matrices B1 and A1, i.e., $TW_1 = W + \Delta W_1$, and $\Delta W_1 = B_1 \times A_1$. Similarly, for model $E_i$, the weight matrix is given by $TW_i = W + \Delta W_i$, $\Delta W_i = B_i \times A_i$ and for model $E_N$, it is given by $TW_N = W + \Delta W_N$, $\Delta W_N = B_N \times A_N$.

In various embodiments, when fine-tuning or training the $E_1$-$E_N$ machine learning models, the base weight matrix W may remain fixed. Instead, only the weights of difference matrices $\Delta W_1$-$\Delta W_N$, represented by the product of low rank matrices, are adjusted. This approach significantly reduces the number of parameters that need to be trained compared to directly adjusting the full base weight matrix W. For example, when training model $E_1$, matrices $B_i$ and $A_1$ can be chosen as low rank matrices compared to the base weight matrix W. This means they have significantly fewer parameters than the base weight matrix W. While base weight matrix W might contain millions of components, matrices $B_1$ and $A_1$ might only have a few thousand, leading to a reduction in parameters needing adjustment during training by one or more orders of magnitude. In some cases, when base matrix W has a dimension of d×k, a first low rank matrix (e.g., $B_1$) may have a dimension of d×r, and a second low rank matrix (e.g., $A_1$) may have a dimension of r×k, where r—is a rank of matrix $B_1$ and $A_1$. The rank r may have any suitable value and is selected based on a number of parameters that may be needed to fully train a machine learning model. For example, in some cases, r can be equal to one, two, three, four, and the like. In various cases, r is selected to be significantly smaller than the smallest of d or k. Decomposing a weight matrix into a fixed base weight matrix W and a difference matrix represented by the product of two low rank matrices is known as Low Rank decomposition. Using only the difference matrix for fine-tuning machine learning models is called Low Rank Adaptation (LoRA), which allows one to fine-tune models at relatively low cost.

Several embodiments discussed herein leverage LoRA, benefiting from its inherent advantages. Moreover, the described embodiments present additional benefits. For instance, a pre-trained model can be shared and utilized to construct numerous small modules for diverse tasks. This pre-trained model can be replicated, and an updated/replaced difference matrix can generate a novel machine learning model. Additionally, the approaches outlined herein facilitate efficient training and a low hardware entry barrier, especially when employing adaptive optimizers. This is achieved by making adjustments solely to parameters of low-rank matrices during the training process, enhancing overall efficiency. Also, since a difference matrix is simply added to the fixed base weight matrix W, minimal inference latency is observed as compared to a fully fine-tuned model, by construction.

In various embodiments, a single copy of base weight matrix W needs to be stored, and various machine learning models $E_1$-$E_N$ may use the same copy of the base weight matrix W when determining inferences. Therefore, only copies of low rank matrices $B_1$-$B_N$ and $A_1$-$A_N$ need to be stored by one or more memory devices associated with machine learning models $E_1$-$E_N$, thereby substantially decreasing the amount of storage needed by these models. Furthermore, to reduce storage, only non-zero entries and their indices can be stored, potentially saving a substantial amount of memory compared to storing dense matrices.

In various embodiments, machine learning models $E_1$-$E_N$ are designed to generate a classification inference, comprising a set of factors associated with probabilities that a specific field in the input data 110 pertains to a particular class. For instance, one or more of the machine learning models $E_1$-$E_N$ might ascertain that a field within an invoice can be categorized as an address, a payment, a date, and the like. In certain scenarios, these models may also identify a specific field in an invoice as a signature. As an illustrative example, a machine learning model $E_1$-$E_N$ could classify an image within an invoice as the logo of the invoice-sending party.

It's important to note that while the set of factors is related to the probability that a particular input data record in the input data 110 belongs to a specific class, they may not directly represent probabilities. For instance, these factors might not necessarily sum up to one; instead, they could be proportional to probabilities without being probabilities themselves. In any case, these factors play a crucial role in determining the classification of a specific field within input data 110.

Any number N of suitable machine learning models $E_1$-$E_N$ may be employed. In some cases, the number N of the machine learning models selected may be based on a number of classes in which input data records of a document may need to be classified. In some cases, the number of machine learning models may be selected based on computing resources available.

Predictive model 100 facilitates the addition and fine-tuning of new machine learning models whenever needed. This allows for seamless adaptation to evolving data and classification requirements. For example, if new input data records belonging to previously unseen classes are encountered, the model allows the addition of one or more new machine learning models specifically designed to handle these new classifications. Once added, these new models can be trained, as described below, to effectively categorize the new input data records.

In various embodiments, the output of machine learning models $E_1$-$E_N$ may be combined using combining layer 160. For example, if an output of the prediction model 100 is a classification inference, then the combining layer 160 can be a weighted combination of classification inferences of a set of machine learning models $E_1$-$E_N$, selected by router layer 140. In some cases, combining the classification inferences includes summation of the classification inferences generated from machine learning models selected by router layer 140 weighted by the probability scores corresponding to the selected machine learning models.

For example, if router layer 140 selected machine learning model $E_1$ and machine learning model $E_s$ for determining a classification inference of a particular field within a document, and the machine learning model $E_1$ determines an output classification inference $Q_1 = \{q_{11}, q_{12}, \ldots q_{1i}, \ldots q_{1n}\}$, with $q_{1i}$ being a factor related to a probability of a particular field having a classification $C_i$, and the machine learning model $E_2$ determines an output classification inference $Q_S = \{q_{S1}, q_{S2}, \ldots q_{Si}, \ldots q_{Sn}\}$, with $q_{Si}$ being a factor related to a probability of the particular field having a classification $C_i$, then the combining layer may compute the overall classification inference 170 as a weighted sum of output classification inferences $Q_1$ and $Q_S$. In some cases, the weights for the weighted sum may be probability scores $P_1$ and $P_S$ which were used by router layer 140 for selecting models E1 and E5. For example, the overall classification inference TO may be computed as $TO = P_1 \cdot Q_1 + P_S \cdot Q_S$ to result in a vector $\{o_1, o_2, \ldots o_N\}$. To select a particular classification, a component with a maximum value can be chosen.

In some cases, when there are at least a few maximum values in a range of values $o_1$-$o_N$ that are sufficiently close, the predictive model 100 may be configured to update the selection of machine learning models $E_1$-$E_N$ for inference classification via routing layer 140 to further differentiate between $o_1$-$o_N$ values and output a suitable classification inference with a higher degree of confidence. In some cases, a degree of confidence may be outputted along with the classification inference based on a variability of values $o_1$-$o_N$ within vector TO.

It should be noted that using probability scores $P_1$-$P_N$ is only one way to weight the output of classification inferences of various machine learning models and any other suitable weights for weighted output may be used. For example, weights $$(P_i^2) / \left( \sum_k P_k^2 \right)$$

can be used, or any other suitable weights.

In various embodiments, the prediction model 100 may incorporate a preprocessor 120 for enhanced data processing capabilities. Preprocessor 120 can be configured to perform diverse operations on text, images, videos, or audio data. When preprocessing text, tokenization may be employed, breaking down the text into smaller units, such as words or subwords. Libraries such as NLTK, SpaCy, or built-in functions within deep learning frameworks can facilitate efficient tokenization. Additionally, preprocessing text may include lowercasing, the removal of stopwords, and the application of stemming or lemmatization techniques. Furthermore, preprocessor 120 may utilize suitable transforms to encode words or phrases, including embeddings like Word2Vec or GloVe, as well as custom embeddings through frameworks like TensorFlow or PyTorch.

Moreover, preprocessor 120 may extend its functionality to include text cleaning procedures, involving the elimination of noise, special characters, or HTML tags. Achieving this cleanliness in the text can be accomplished through the use of regular expressions or dedicated string manipulation functions. The combination of these preprocessing techniques can be tailored to the specific characteristics of the data, aligning with the requirements of the text classification task at hand. This optimization process ensures that the input is finely tuned for effective learning by the neural network.

Furthermore, in certain instances, preprocessing includes the preprocessing of images or video in the input data. For these images (or video), diverse transformations are applied using well-established approaches such as, resizing, edge extraction, color space conversion, and noise reduction, among others. These measures collectively contribute to refining the input data and facilitating optimal performance in subsequent image classification tasks.

In some embodiments, preprocessor 120 may be configured to identify fields within a document that needs classification. For example, preprocessor 120 may extract fields from the document that need classification or may identify regions within the document that need classification. In some cases, when input data 110 is represented as a set of tokens, one or more tokens may be identified as corresponding to a data field that requires classification. In some cases, identifying fields that need classification within input data 110 is performed by neural network layers 130. In particular, neural network layers 130 may process input data 110 and split input data 110 into input data records, each of which may need to be classified.

Description of Methods for Performing Classification Inference

Figure 2:
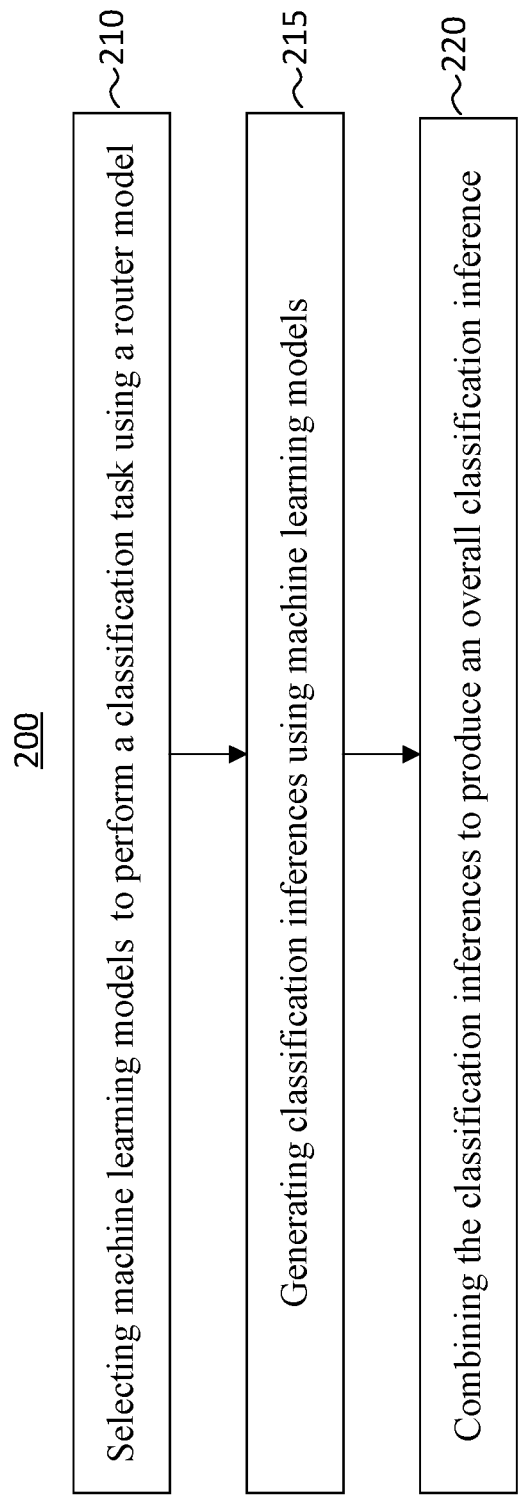
FIG. 2 is an example method for classifying data using the predictive model shown in FIG. 1, in accordance with disclosed embodiments.

This disclosure, in its various embodiments, describes further a method for the classification and extraction of data records from various data files containing text, images, video, or multimedia. An example embodiment of a method 200 is shown in FIG. 2. Method 200 includes at step 210 selecting one or more machine learning models from a plurality of machine learning models to perform a classification task using a router model based on an input data record. In some cases, the input data record may be an input data record obtained by a neural network layer 130 using input data 110, as described above. In various embodiments, the router model may be router layer 140, and the machine learning models may be models E1-EN of the prediction layer 150. As previously described router layer 140 may select one or more machine learning models from the plurality of machine learning models E1-EN based on information obtained from an input data record.

Further, method 200 includes at step 215, generating a classification inference from each one of the one or more selected machine learning models, wherein the classification inference includes a set of factors related to a probability that the input data record belongs to each one of a plurality of candidate classes. Such classification inference may be, for example, classification inferences $Q_1$-$Q_N$ as shown in FIG. 1. The plurality of machine learning models may include at least a first machine learning model and a second machine learning model each one having a weight matrix. For example, if the first machine learning model is $E_1$ and a second machine learning model is $E_2$, then the first weight matrix is $TW_1$ and the second weight matrix is $TW_2$. The weight matrix of the first machine learning model is calculated as a sum of a base weight matrix and a first difference matrix, and the weight matrix of the second machine learning model is calculated as a sum of the base weight matrix and a second difference matrix.

Further, method 200 includes at step 220, combining the classification inferences from each one of the one or more machine learning models to produce an overall classification inference. For example, in reference to FIG. 1, at least some classification inferences $Q_1$-$Q_N$ including a set of factors related to the probability that the input data record belongs to each one of the plurality of candidate classes, may be combined to produce the overall classification inference (e.g., overall classification inference 170, as shown in FIG. 1), the overall classification inference being based on the classification inferences from each one of the one or more selected machine learning models.

Figure 3:
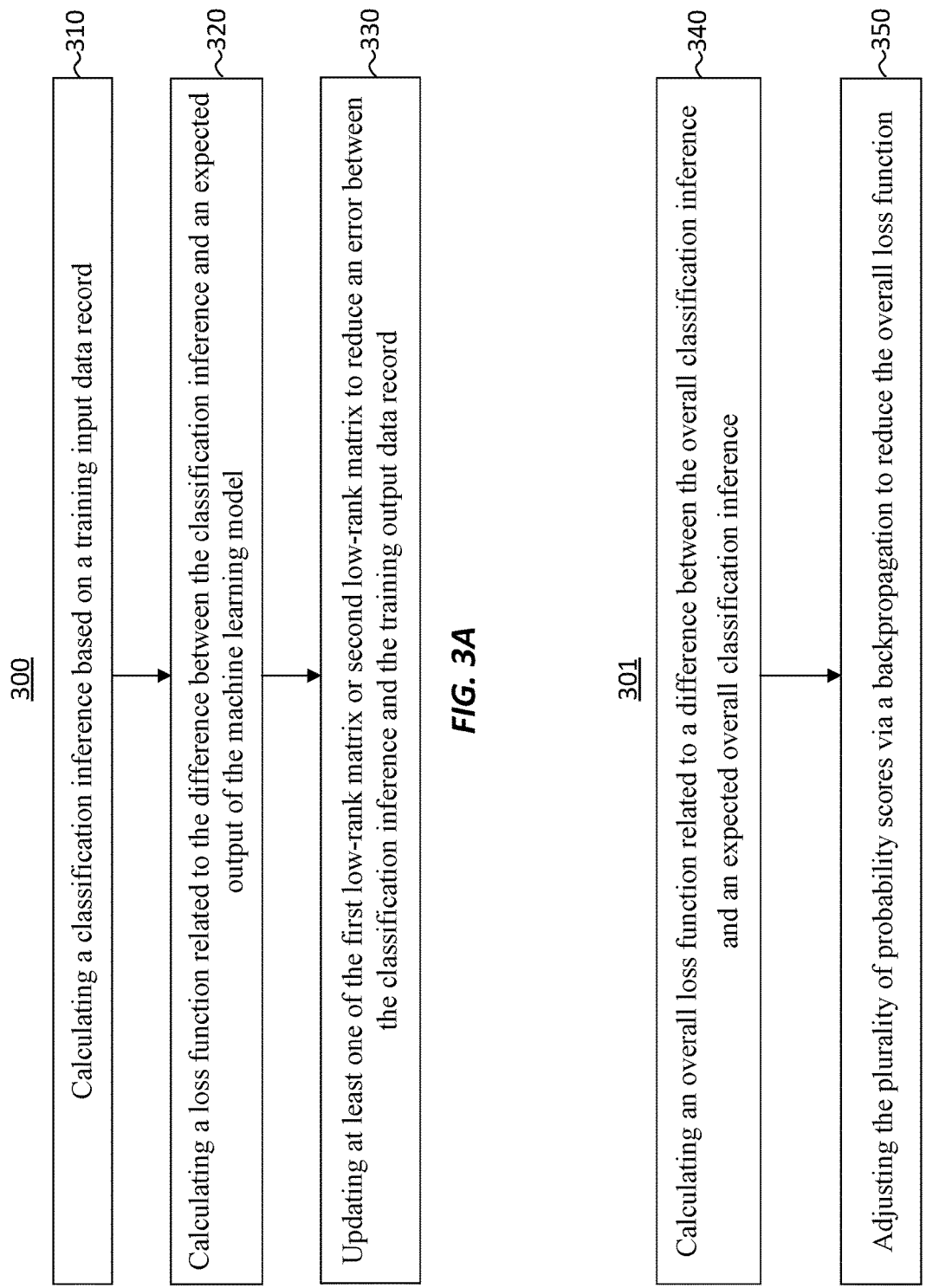
FIG. 3A is a method of training machine learning models of the predictive model, in accordance with disclosed embodiments.
FIG. 3B is a method of training a routing layer of the predictive model, in accordance with disclosed embodiments.

In various cases, machine learning models, such as machine learning models $E_1$-$E_N$ of prediction layer 150, as shown in FIG. 1, are trained to classify input data records in input data. An example of a training method 300 is shown in FIG. 3A. Method 300 includes at step 310, calculating a classification inference by the first machine learning model based on a training input data record, and at step 320, calculating a loss function related to the difference between the classification inference and an expected output of the machine learning model. Further, method 300 includes at step 330 updating at least one of a first low rank matrix, such as, for example, matrix $B_1$ for model $E_1$, or a second low rank matrix, such as, for example, matrix $A_1$ for model $E_1$, to reduce an error between the classification inference and the expected output of the machine learning model.

In various cases, the update to low rank matrices may be performed using a backpropagation approach. For example, during the backpropagation, a gradient matrix is computed. This gradient matrix contains the partial derivatives of the loss function relative to each element of a difference matrix (e.g., a difference matrix $\Delta W_1 = B_1 \times A_1$). The gradient of a difference matrix, such as $\Delta W_1$ may then be decomposed into two low-rank matrices of the same rank as rank of $B_1$ and $A_1$, which can be denoted by $G_{B1}$ and $G_{A1}$, using techniques like a singular value decomposition (SVD) or any other suitable approaches (e.g., a non-negative matrix factorization). Subsequently, these gradients $G_{B1}$ and $G_{A1}$ may be used for updating matrices $B_{i1}$ and $A_1$. In some cases, only one matrix may be updated (e.g., only matrix $B_1$ or $A_1$). Further, in some cases, during some training steps, only matrix $B_1$ is updated, while during other training steps, matrix $A_1$ is updated. In an example embodiment, matrices $B_1$ and $A_1$ may be trained via a continuous update using any suitable approach such as gradient descent, coordinate descent, or any other suitable update technique.

Further, not only machine learning models, such as models $E_1$-$E_N$, as shown in FIG. 1 may be trained, but also a routing layer, such as routing layer 140, as shown in FIG. 1. An example embodiment of a method 301 for training a routing layer is shown in FIG. 3B. Method 301 includes at step 340, calculating an overall loss function related to a difference between the overall classification inference and an expected overall classification inference, and at step 350, adjusting various probability scores such as $P_1$-$P_N$, via a backpropagation to reduce the overall loss function.

Figure 4:
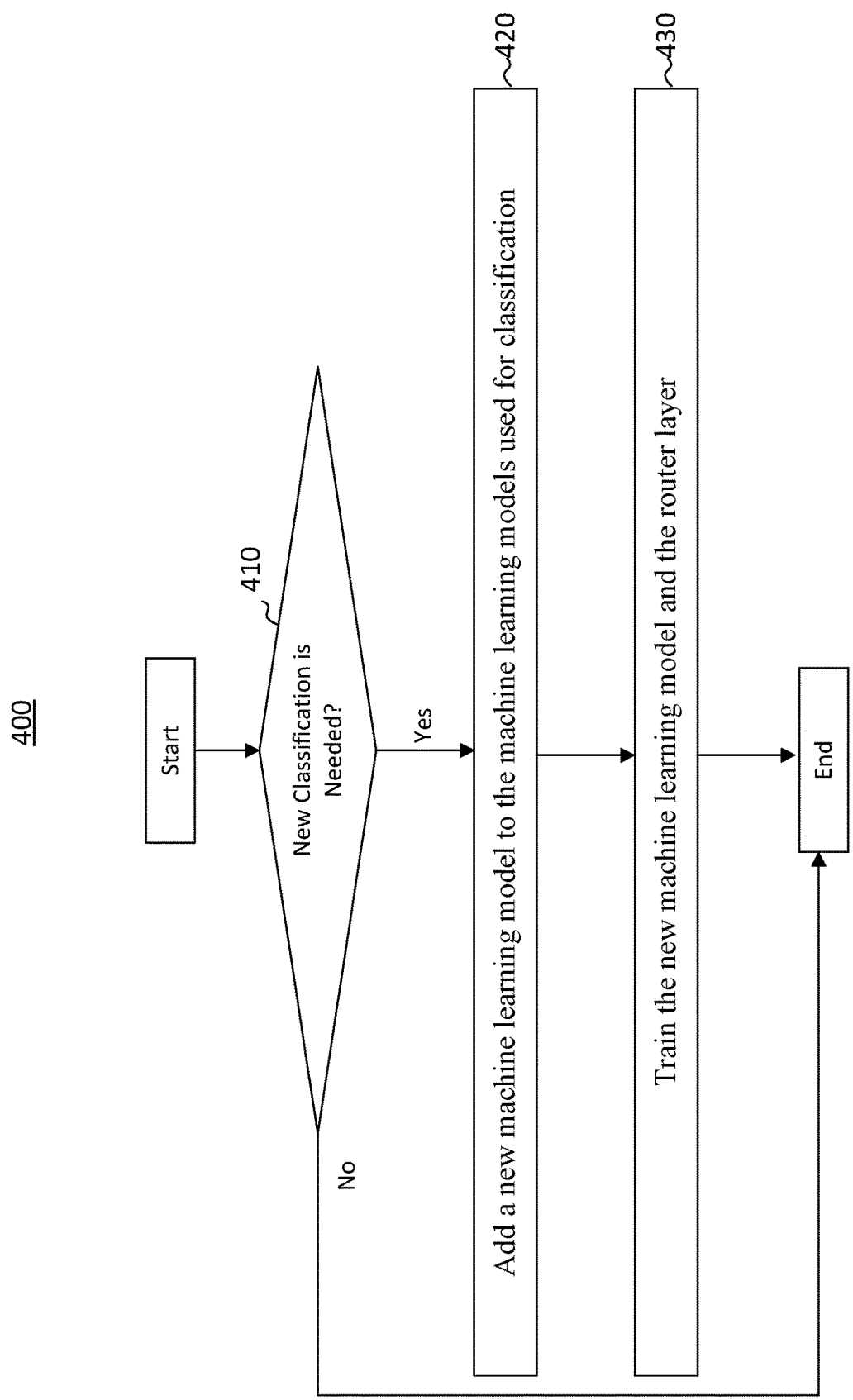
FIG. 4 is a method of adding a new machine learning model to the predictive model, in accordance with disclosed embodiments.

As described above, in many instances, when adaptation to evolving data is needed, a new machine learning model may be added to the predictive model 100. An illustrative embodiment of method 400 of adding a new machine learning model is shown in FIG. 4. Method 400 includes determining at step 410 whether a new classification for an input data record is needed. For example, if a document includes a new data record, such as a signature, for example, a new classification may be needed, and such classification inference may be accomplished by adding a new machine learning model. If the new classification is needed, (step 410, Yes), method 400 proceeds to step 420 and adds a new machine learning model to existing machine learning models. For example, a new machine learning model may be added to machine learning models $E_1$-$E_N$ of prediction layer 150, as shown in FIG. 1. Adding a new machine learning model includes duplicating one of the existing machine learning models and initializing a difference matrix of this duplicate model to any suitable initial values. For example, in some cases, the difference matrix may be initialized by initializing low rank matrices that when multiplied result in the difference matrix. For example, a first low rank matrix may be initialized using a random Gaussian initialization, while a second low rank matrix may be set to zero resulting in the difference matrix having zero values. Alternatively, both low rank matrices can be initialized using random Gaussian initialization. It should be understood that any suitable initialization of the low rank matrices can be used. The new machine learning model is configured to share a base weight matrix (e.g., base weight matrix W, as shown in FIG. 1) with other machine learning models.

Method 400 may proceed to train the new machine learning model at step 430. The training may be similar or the same to the training method 300, as described in relation to FIG. 3A. After completion of the training, the new machine learning model may be integrated into a predictive model. In various cases, when a new classification is determined to be needed, a new classification label may be appended to a set of classification labels corresponding to candidate classifications that can be used for classifying different input data records.

If the new classification is not needed, (step 410, No), method 400 may be completed and no new machine learning model may be added.

Figure 5:
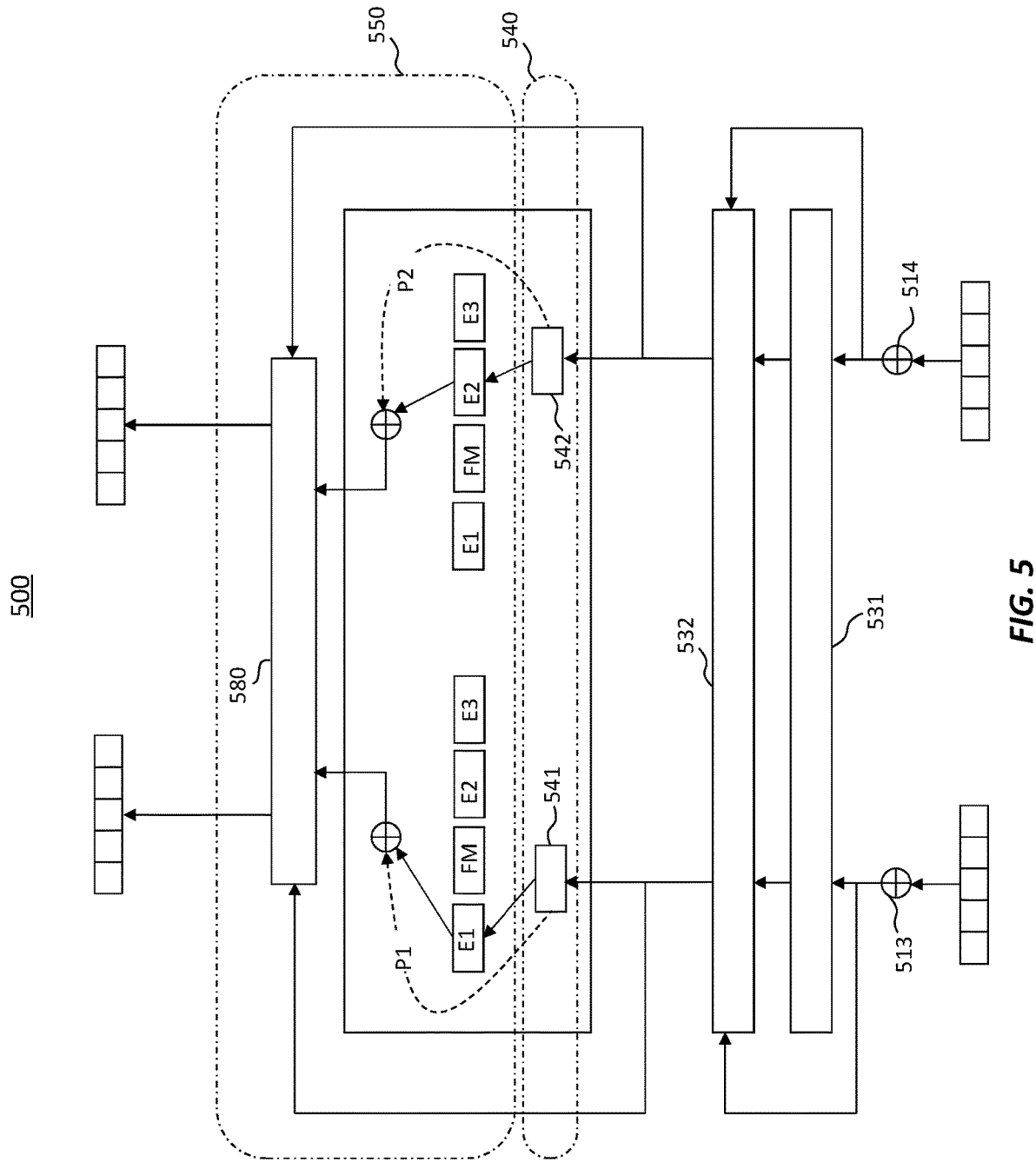
FIG. 5 is an example predictive model used as a part of a transformer architecture, in accordance with disclosed embodiments.

In various embodiments, a predictive model, such as predictive model 100, may form an integral part of a transformer model. As illustrated in FIG. 5, an exemplary transformer model 500 includes a self-attention layer 531, a first normalization-addition layer 532, a routing layer 540 featuring two routers-routers 541 and 542, a predictive layer 550 housing machine learning models $E_1$-$E_3$, along with the foundation model FM, and a second normalization-addition layer 580. The transformer model 500 further includes positional encoding layers 513 and 514.

In the illustrated embodiment of transformer model 500, router 541 is designed to select machine learning model $E_1$, characterized by a first weight matrix—a summation of a base weight matrix and a first difference matrix derived from the multiplication of two low-rank matrices. Router 541 is configured to select machine learning model $E_1$ with a probability score of $P_1$. Similarly, router 542 selects machine learning model $E_2$ with a probability score of $P_2$. Correspondingly, similar to machine learning model $E_1$, both machine learning models $E_2$ and $E_3$ incorporate respective weight matrices, computed as a sum of a base weight matrix and an associated difference matrix formed by the multiplication of two associated low-rank matrices.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
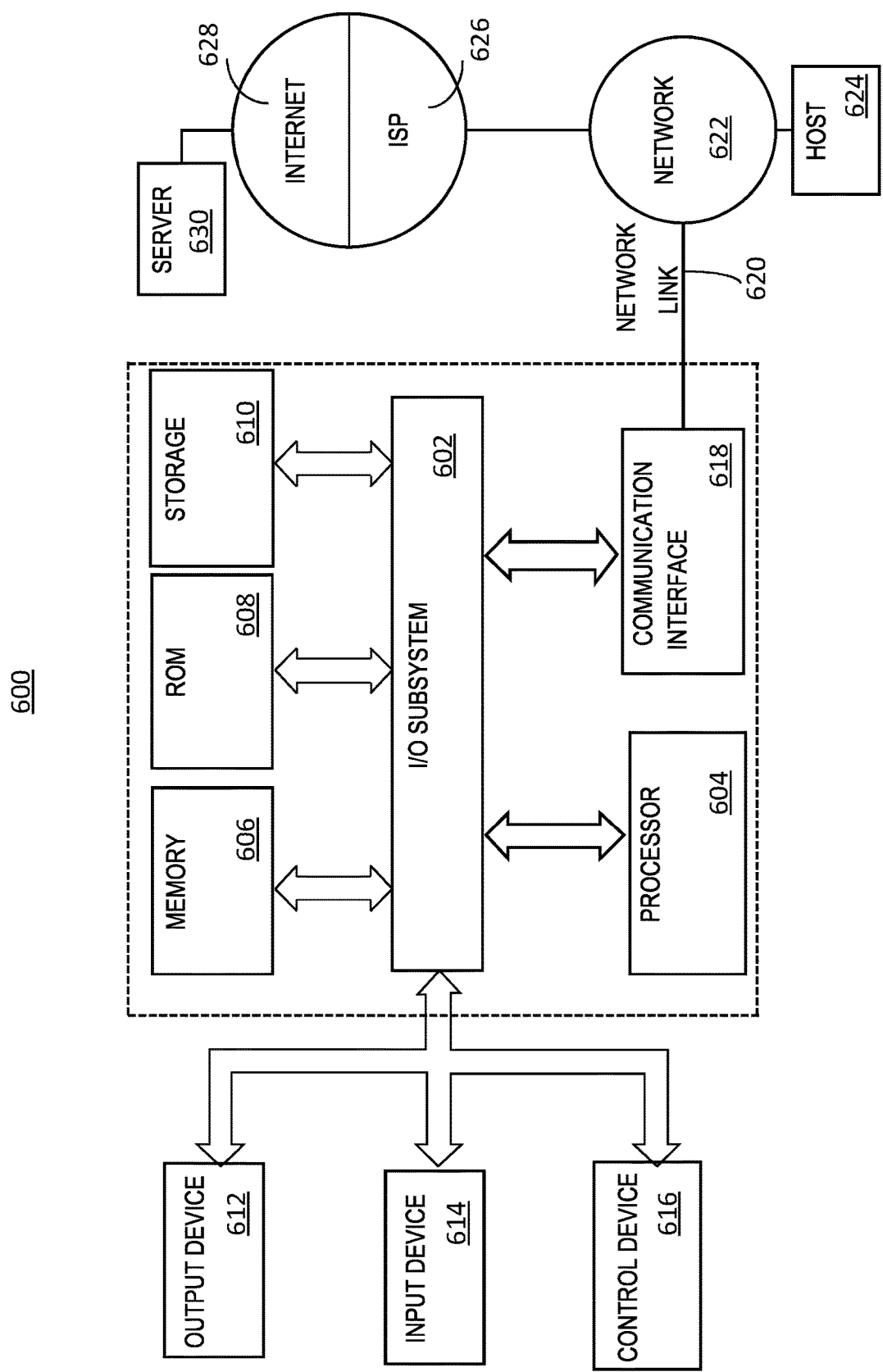
FIG. 6 is an illustrative computer system suitable for implementing the methods described herein, in accordance with disclosed embodiments.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or another static storage device coupled to I/O subsystem 602 for storing information and instructions for processor 604. ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, solid-state storage, magnetic disk, or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608, or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer, and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on output device 612. Control device 616 may have at least two degrees of freedom in two axes, a first axis (e.g., x) and a second axis (e.g., y), that allows the device to specify positions in a plane. Another type of input device may be a wired, wireless, or optical control device such as a joystick, wand, console, steering wheel, pedal, gearshift mechanism or other type of control device. Input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to host 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the present disclosure have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the present disclosure, is the literal and equivalent scope of the set of claims that issue from this application, in the specific form in which such claims issue, including any subsequent correction.

What is claimed is:

1. A computer-implemented method to classify input data records using machine learning models, the method comprising:
    selecting one or more machine learning models from a plurality of machine learning models to perform a classification task using a router model based on an input data record;
    generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix;
    wherein the first difference matrix is calculated by multiplying a first low rank matrix by a second low rank matrix, wherein a rank of the first low rank matrix is equal to a rank of the second low rank matrix, and the rank of the first low rank matrix is less than a rank of the base matrix, and wherein the second difference matrix is calculated by multiplying a third low rank matrix by a fourth low rank matrix, wherein a rank of the third low rank matrix is equal to a rank of the fourth low rank matrix, and the rank of the third low rank matrix is less than a rank of the base matrix; and
    combining the classification inferences from each one of the one or more machine learning models to produce an overall classification inference, wherein the overall classification inference comprises a set of factors related to the probability that the input data record belongs to each one of the plurality of candidate classes, the overall classification inference being based on the classification inferences from each one of the one or more selected machine learning models.

2. The computer-implemented method of claim 1, wherein the plurality of machine learning models further comprises a third machine learning model, where a matrix component of the third machine learning model is the base weight matrix.

3. The computer-implemented method of claim 1, wherein the first machine learning model has been trained using a training method comprising:
    calculating a classification inference by the first machine learning model based on a training input data record;
    calculating a loss function related to the difference between the classification inference and an expected output of the machine learning model; and
    updating at least one of the first low rank matrix or second low rank matrix to reduce an error between the classification inference and the expected output of the machine learning model.

4. The computer-implemented method of claim 1, wherein the generating the classification inference from each one of the one or more selected machine learning models further comprises:
    storing, in a memory, the base weight matrix;
    storing, in the memory, the first low rank matrix, the second low rank matrix, the third low rank matrix, and the fourth low rank matrix;

calculating the matrix component of the first machine learning model by multiplying the first low rank matrix by the second low rank matrix, and adding the base weight matrix; and calculating the matrix component of the second machine learning model by multiplying the third low rank matrix by the fourth low rank matrix and adding the base weight matrix.

5. The computer-implemented method of claim 1, wherein the set of factors are probability values that input data record belongs to each one of the plurality of candidate classes.

6. The computer-implemented method of claim 1, wherein the set of factors related to a probability is generated using a softmax function.

7. The computer-implemented method of claim 1, wherein the selecting of one or more machine learning models using the router model includes determining a plurality of probability scores, each one corresponding to one of the plurality of machine learning models, and wherein each one of the plurality of probability scores representing a likelihood that the corresponding one of plurality of machine learning models produces the classification inference closely matching an expected output.

8. The computer-implemented method of claim 7, wherein the selecting comprises selecting the one or more machine learning models from the plurality of machine learning models with corresponding probability scores above a predetermined threshold.

9. The computer-implemented method of claim 7, wherein the selecting comprises selecting a predetermined number of the one or more machine learning models from the plurality of machine learning models, the predetermined number of the one or more machine learning models having highest corresponding probability scores.

10. The computer-implemented method of claim 9, wherein the predetermined number is one.

11. The computer-implemented method of claim 7, wherein the combining of the classification inferences comprises summation of the classification inferences generated from each one of the one or more selected machine learning models weighted by the probability scores corresponding to each one of the one or more selected machine learning models.

12. The computer-implemented method of claim 7, wherein the router model has been trained using a router training method, the router training method comprising:

calculating an overall loss function related to a difference between the overall classification inference and an expected overall classification inference; and adjusting the plurality of probability scores via a backpropagation to reduce the overall loss function.

13. The computer-implemented method of claim 1, wherein the classification of the input data records includes classifying at least one of text or images within an input document into data fields.

14. The computer-implemented method of claim 1, wherein the candidate classes comprise a first set of classification labels, the method further comprising:

appending the candidate classes by at least one new classification label; and adding at least one new machine learning model to the plurality of machine learning models.

15. A system implemented by one or more computers for classifying input data records using machine learning models, the system comprising:

one or more memories having computer readable computer instructions; and one or more processors for executing the computer readable computer instructions to perform a method comprising:

selecting one or more machine learning models from a plurality of machine learning models to perform a classification task using a router model based on an input data record;

generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix;

wherein the first difference matrix is calculated by multiplying a first low rank matrix by a second low rank matrix, wherein a rank of the first low rank matrix is equal to a rank of the second low rank matrix, and the rank of the first low rank matrix is less than a rank of the base matrix; and combining the classification inferences from each one of the one or more machine learning models to produce an overall classification inference, wherein the overall classification inference comprises a set of factors related to the probability that the input data record belongs to each one of the plurality of candidate classes based on the classification inferences from each one of the one or more selected machine learning models.

16. The system of claim 15, wherein the selecting of one or more machine learning models using the router model includes determining a plurality of probability scores, each one corresponding to one of the plurality of machine learning models.

17. One or more computer-readable non-transitory storage media storing computer readable programming instructions configured to be executed by one or more processors to perform a method comprising:

selecting one or more machine learning models from a plurality of machine learning models to perform a classification task using a router model based on an input data record;

generating a classification inference from each one of the one or more selected machine learning models, wherein the classification inference comprises a set of factors related to a probability that the input data record belongs to each one of a plurality of candidate classes, and wherein the plurality of machine learning models comprise a first machine learning model and a second machine learning model where a matrix component of the first machine learning model is calculated as a sum of a base weight matrix and a first difference matrix, and a matrix component of the second machine learning model is calculated as a sum of the base weight matrix and a second difference matrix;

wherein the first difference matrix is calculated by multiplying a first low rank matrix by a second low rank matrix, wherein a rank of the first low rank matrix is equal to a rank of the second low rank matrix, and the rank of the first low rank matrix is less than a rank of the base matrix; and combining the classification inferences from each one of the one or more machine learning models to produce an overall classification inference, wherein the overall classification inference comprises a set of factors related to the probability that the input data record belongs to each one of the plurality of candidate classes based on the classification inferences from each one of the one or more selected machine learning models.

18. The one or more computer-readable non-transitory storage media of claim 17, wherein the selecting of one or more machine learning models using the router model includes determining a plurality of probability scores, each one corresponding to one of the plurality of machine learning models.

* * * * *